US007505756B2

(12) United States Patent
Bahl (10) Patent No.: US 7,505,756 B2
(45) Date of Patent: Mar. 17, 2009

(54) DYNAMIC ONLINE SUBSCRIPTION FOR WIRELESS WIDE-AREA NETWORKS

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 10/778,849

(22) Filed: Feb. 13, 2004

(65) Prior Publication Data
US 2005/0083846 A1 Apr. 21, 2005

Related U.S. Application Data

(60) Provisional application No. 60/511,559, filed on Oct. 15, 2003.

(51) Int. Cl.
*H04M 1/66* (2006.01)
(52) U.S. Cl. ............... 455/410; 455/414.1; 455/435.1; 455/550.1; 370/331
(58) Field of Classification Search ............. 455/41.2, 455/422.1, 403, 435.1, 414.1, 425, 463, 41.3, 455/550.1, 558, 556.2; 370/331, 332, 342
See application file for complete search history.

(56) References Cited

U.S. PATENT DOCUMENTS

2004/0014423 A1* 1/2004 Croome et al. ............. 455/41.2
2004/0162105 A1* 8/2004 Reddy et al. ................ 455/551

OTHER PUBLICATIONS

Josefsson et al., "Protected EAP Protocol (PEAP) v2", draft-josefsson-pppext-eap-tis-eap-07.txt, Oct. 2003, http://www.ietf.org/internet-drafts/draft-josefsson-pppext-eap-tis-eap-07.txt.
GSM Technical Specification GSM 04.08 (ETS 100 940): "Digital cellular telecommunication system (Phase 2+); Mobile radio interface layer 3 specification", European Telecommunications Standards Institute, Jun. 2000 Version 7.8.0.
Overview of GPRS, from Cisco IOS Mobile Wireless Configuration Guide, http://www.cisco.com/univercd/cc/td/doc/product/software/ios122/122cgcr/fmwirec/mwcfprt1/mwcfgpov.htm.
Roger Kalden, Ingo Meirick, and Michael Meyer, "Wireless Internet Access Based on GPRS", Ericsson Research, Ericsson Eurolab Deutschland, *IEEE Personal Communications*, Apr. 2000 pp. 8-18.
Buckley et al., EAP SIM GMM Authentication, http://www.ietf.org/internet-drafts/draft-buckley-pppext-eap-sim-gmm-00.txt.

(Continued)

*Primary Examiner*—Tony T Nguyen
(74) *Attorney, Agent, or Firm*—Wolf, Greenfield & Sacks, P.C.

(57) ABSTRACT

Methods and systems are provided for dynamically subscribing for access to a wireless wide-area network via an online process. Subscription information and user credentials are digitally transmitted by a network carrier to a networking device and is stored locally by the device in a SmartCard, other portable medium, or on the device's hard drive. The locally stored credentials and information may subsequently be updated wirelessly. No human interaction is required to subscribe, and access may be limited by a variety of criteria. A subscription may be used to access networks operated by multiple network carriers.

57 Claims, 7 Drawing Sheets

OTHER PUBLICATIONS

Song, SIP server IPCP configuration option for PPP, http://www.ietf.org/internet-drafts/draft-song-pppext-sip-support-01.txt.

Heckmanns et al., Design and Evaluation of 3G Security, ACTS Mobile Summit, Oct. 2000.

Motorola, Avaya & Proxim Agree to Solve WLAN-WWAN Roaming Issues http://www.mobileinfo.com/News_2003/Issue03/WLAN_Trio.htm.

Yonker et al., Merging WLAN, WWAN Radios in Mobile Designs, CommsDesign.com, Jun. 19, 2002; URL: http://www.commsdesign.com/story/OEG20020619S0016.

Nokia, WLAN Identity Privacy with Cryptographic Temporary Identifiers, 3GPP TSG WG3 Security, Nov. 2002 http://www.3gpp.org/ftp/tsg_sa/WG3_Security/2002_meetings/TSGS3_26_Oxford/Docs/PDF/S3-020624.pdf.

Gellens, Wireless Device Configuration (OTASP/OTAPA) via ACAP, http://www.ietf.org/rfc/rfc2636.txt?number=2636.

Over the Air Service Provisioning, Logica White Paper 1.0, Feb. 2000, http://www.totaltele.com/whitepaper/docs/Logica_whitepaperota.pdf.

R. Enns, XMLCONF configuration protocol, Aug. 2003, http://www.watersprings.org/pub/id/draft-enns-xmlconf-spec-00.txt.

* cited by examiner

DYNAMIC ONLINE SUBSCRIPTION FOR WIRELESS WIDE-AREA NETWORKS

CROSS-REFERENCE TO RELATED APPLICATION

The present application claims the benefit of Bahl, U.S. Provisional Patent Application No. 60/511,559 entitled, "Dynamic on-line subscription and provisioning for 2.5 G/3 G connectivity", filed on Oct. 15, 2003, which is hereby incorporated by reference in its entirety.

FIELD OF THE INVENTION

This invention pertains generally to the field of network communications and in particular to the field of methods and systems for provisioning wireless services.

BACKGROUND OF THE INVENTION

Wireless Wide Area Networks (WWANs, better known as cellular service providers) allow computers to connect to networks employing WWAN protocols such as Global System Mobile (GSM), General Packet Radio Service (GPRS), Code Division Multiple Access (CDMA), etc. Although originally used for voice transmission, these networks can provide efficient data services to their end users, who have computers or other devices equipped with WWAN network interface hardware.

In order to connect to a network, operators generally require some method of identification and authentication to ensure that a user is entitled to gain access to the network and that the user's identity is not being misappropriated. To this end, prior GSM/GPRS systems required users to subscribe to network services by registering with the network operator and physically receiving a Subscriber Identity Module (SIM), which is used by the user's networking device. The SIM is a single-chip computer containing memory, a microprocessor and with or without an operating system, a file system, and applications. It is a security module for customer authentication, owned (and trusted) by the GSM/GPRS network operator. The card is about the size of a thumbprint. It stores unique identifying credentials, including a master key, that allow the network operator to verify the authenticity of the user's identity. The master key is a fixed value uniquely associated with the SIM card. SIM cards also sometimes contain an integrated web browser, a roaming profile, games and entertainment, and other personal information such as an address book and text messages.

A user wishing to subscribe to a GPRS carrier in a previous system contacted an agent of the carrier through some direct human contact (over the telephone, at a customer care center of the carrier, etc.) and, after some interaction, obtained a SIM card that had been associated with that user's identity. The subscription process was thus very much an off-line process. The SIM card was inserted into the networking device, and the user could then access that particular carrier's network. Once obtained, the SIM card could be subsequently provisioned with data, such as applications, menus, network information, etc., from the network operator using an over-the-air (OTA) provisioning protocol. The master key on the SIM card, however, is fixed.

BRIEF SUMMARY OF THE INVENTION

Embodiments of the present invention provide methods and systems for dynamically subscribing online for access to a WWAN carrier. In one aspect of the invention, a subscription module incorporated within a network server is provided, the subscription module facilitating subscribing a networking device for access to at least one wireless wide-area network (WWAN), the module executing the steps of receiving a subscription request and digitally transmitting subscription information for the networking device in response to the request, wherein the subscription information comprises data for authenticating the networking device during attempts by the networking device to access the at least one WWAN.

In another aspect of the invention, a method is provided for subscribing a networking device for access to at least one WWAN comprising the steps of receiving a subscription request and digitally transmitting subscription information for the networking device in response to the request, wherein the subscription information comprises data for authenticating the networking device during attempts by the networking device to access the at least one WWAN.

In yet another aspect of the invention, a method is provided of subscribing a networking device for access to at least one WWAN comprising the steps of contacting a subscription service and digitally receiving subscription information for the networking device from the subscription service, wherein the subscription information comprises data for authenticating the networking device during attempts by the networking device to access the at least one WWAN.

In still another aspect of the invention, a portable storage medium is provided for storing WWAN subscription information, whereby attaching the portable storage medium to a networking device enables establishing wireless connectivity between the networking device and at least one WWAN. In one embodiment, the portable storage medium is a SmartCard. In another embodiment, the portable storage medium is a Universal Identity Card. In yet another embodiment, the portable storage medium is a computer hard drive.

In another aspect of the invention, a method is provided in a system comprising a subscription service and a plurality of wireless networks operated by a plurality of network carriers, the method enabling a networking device to access any of the plurality of wireless networks, and comprising the steps of receiving, by the subscription service, a subscription request from the networking device, and causing, by the subscription service, a first set of subscription information to be digitally transmitted to the networking device in response to the request, wherein the first set of subscription information allows the networking device to access any of the plurality of wireless networks.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems supporting dynamic online WWAN subscription will now be described with respect to preferred embodiments; however, the methods and systems of the present invention are not limited to dynamic online WWAN subscription. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
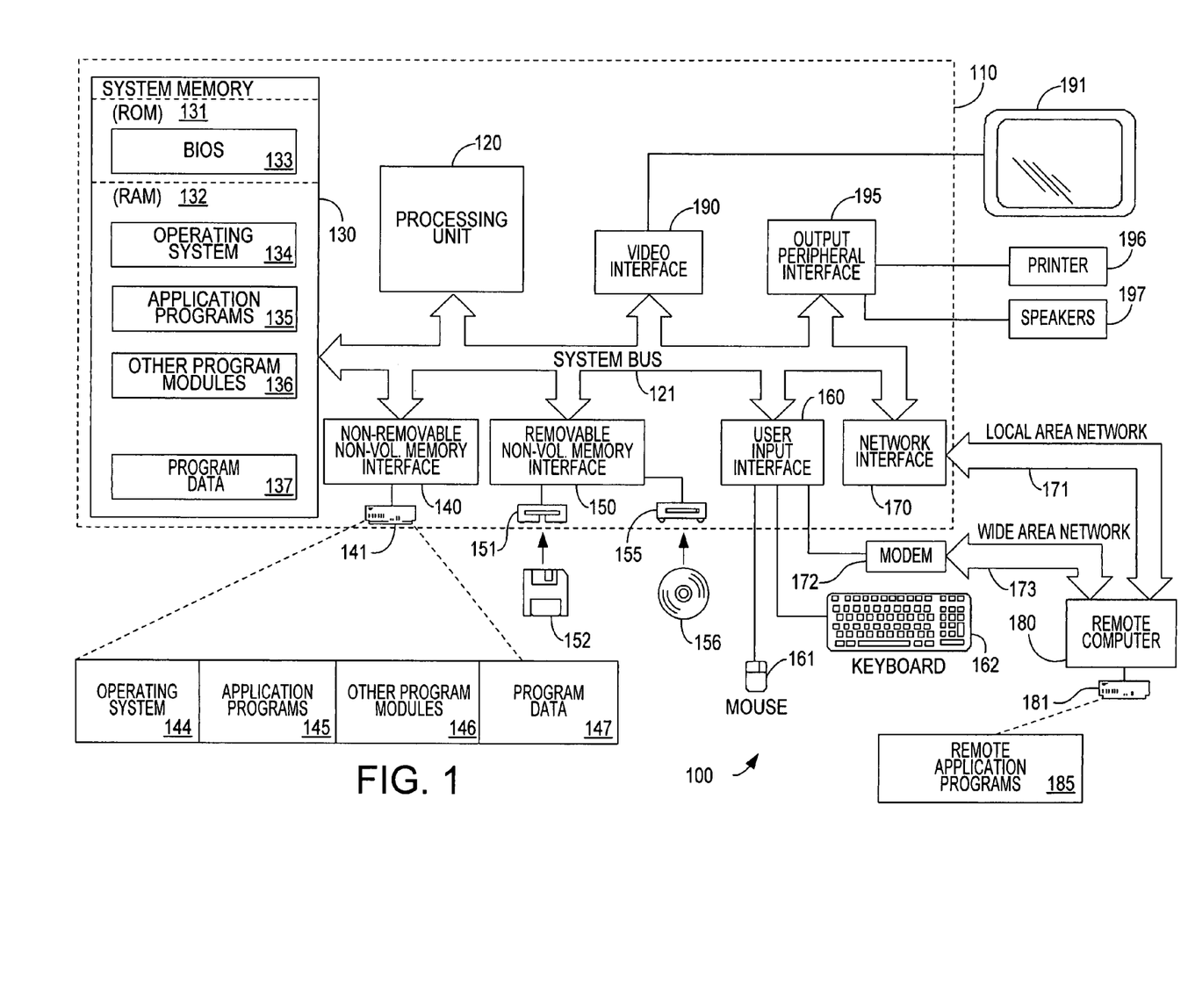
FIG. 1 is a simplified schematic illustrating an exemplary architecture of a computing device for carrying out dynamic online subscription and provisioning in accordance with an embodiment of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SmartCards, SecureDigital cards, SmartMedia cards, CompactFlash cards and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. Alternatively, the computer 110 contains a wireless LAN network interface operating on, for example, the 802.11b protocol, allowing the computer 110 to connect to the LAN 171 without a physical connection. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. Alternatively, the computer 110 contains a wireless WAN network interface operating over, for example, the General Packet Radio Service (GPRS), allowing the computer 110 to connect to the WAN 173 without a physical connection. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Additionally, variations of the computer 110 may be incorporated into other exemplary systems for implementing the invention, such as cellular phones, personal digital assistants, and the like.

Figure 2:
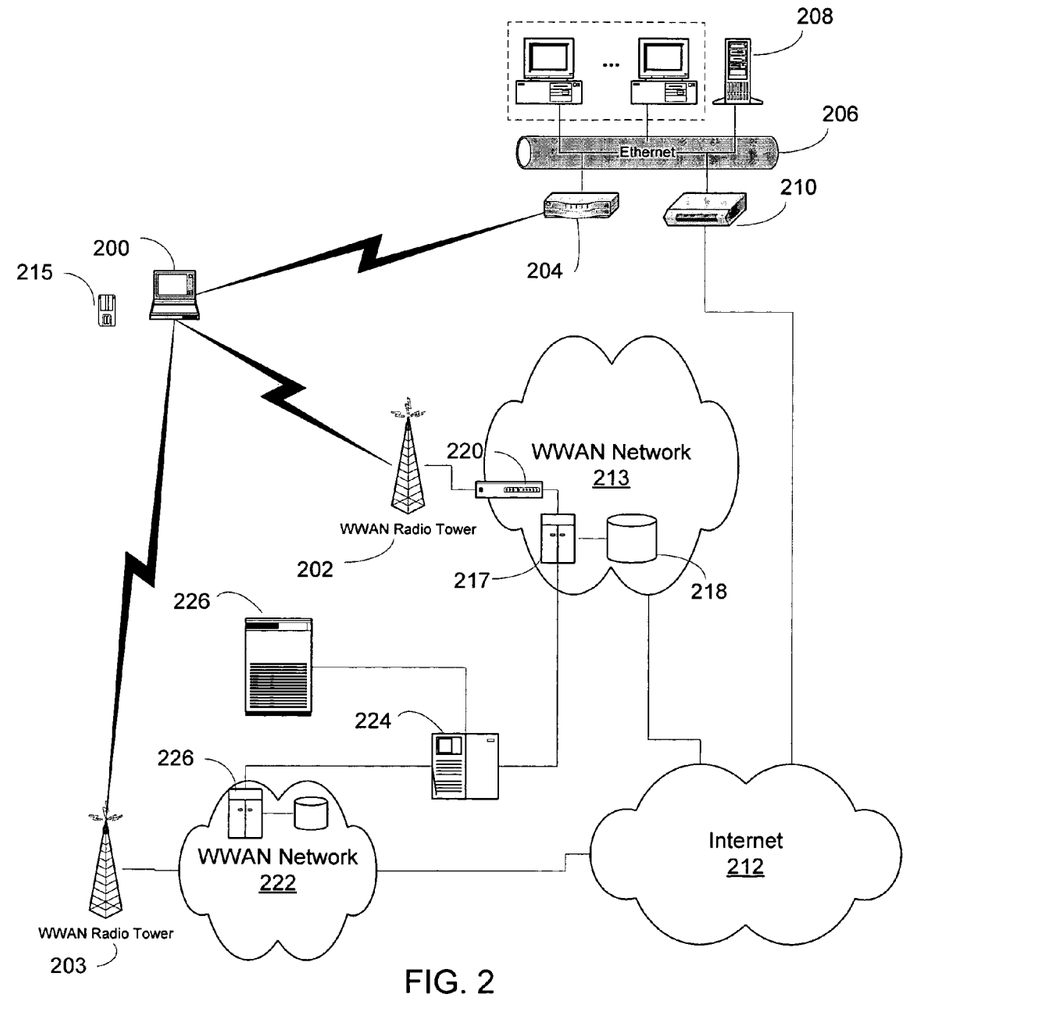
FIG. 2 is an exemplary multiple network communication media arrangement including multiple network access points and a subscription server to which a mobile networking device potentially connects, in accordance with an embodiment of the invention.

The present invention is potentially incorporated into computing devices/machines used in a variety of networking environments. Turning to FIG. 2, a simple example of a wireless wide-area networking environment is depicted wherein the invention is potentially exploited. In the illustrative environment, a networking device 200 is a device, including multiple network interfaces (not specifically shown), facilitating communications over multiple communications media. Alternatively, the device 200 is a general mobile station, which could be a computer, cellular telephone, personal digital assistant, or other mobile device. In the particular example depicted in FIG. 2, the networking device 200 communicates with a first cellular transmission tower 202 (via WWAN media), a second cellular transmission tower 203 and a wireless transceiver 204 (via WLAN media) that is communicatively coupled to a local area network 206.

The wireless transceiver 204 (also referred to as a wireless access point, or WAP) provides access to a variety of resources on the LAN 206. For example, the wireless transceiver 204 provides access by the networking device 200 to directories/files maintained on a file server 208. The LAN 206 also contains a gateway/firewall/modem 210 providing access by users of the LAN 206, including the user of the networking device 200, to the Internet 212. The gateway/firewall/modem 210 also provides access by users of the Internet 212 to the resources on the LAN 206.

The user of the networking device 200, as a result of multiple supported network media, is able to access the Internet 212 and the file server 208 (through the Internet 212) via multiple communication media. For example, utilizing a WWAN network interface, the networking device 200 is able to access a WWAN 213 and the Internet 212 via a cellular network including the first cellular transmission tower 202. Alternatively, the networking device 200 accesses resources on the LAN 206 via the wireless transceiver 204. The LAN 206 in the illustrative example is assumed to include network access and proxy servers that enable a properly authenticated user of the networking device 200 to access resources of the Internet 212 and the LAN 206 via either of the two illustratively depicted wireless network media.

In order to communicate over a wireless network such as the WWAN 213 or wireless LAN 206, the networking device 200 must first be provisioned with settings necessary for communications on the network. In traditional WWAN networks, networking device 200 is a GSM phone and is typically initially provisioned for network communications in an off-line process by obtaining a Subscriber Identity Module (SIM) 215. In embodiments of the invention, however, networking device 200 is any of a variety of general purpose computing devices. The networking device 200 is initially provisioned for network communications in an online process by a provisioning server 217 using identity information about the device 200. Identity information is generally stored at the device 200 in the form of a SmartCard, hard drive, or other portable media such as a USB flash drive. The provisioning server 217 has stored in a database 218 the identity information along with additional information pertaining to the device 200. The additional information could include, for example, a time or bandwidth limit for the computer, restrictions on access or the type of content to be communicated, or other information. The database 218 is then used by a gateway 220, which routes all network communications to and from the device 200. The provisioning server 217 might also send connection information to the device 200, such as an encryption key to allow for secure communications with the WWAN 213. In this way, the gateway 220 only allows access to computers that have been provisioned for communications over the WWAN 213, and further can ensure that any qualifications on those communications, such as time or content restrictions, are enforced.

Alternatively, the provisioning server 217 provisions the device 200 for communications over a multitude of networks. This arrangement is useful, for example, when the device 200 is in the range of multiple WWAN radio towers 202 and 203, and a single provisioning server is capable of granting communications access over any or all of the towers. In an exemplary arrangement, the device 200 communicates with the provisioning server 217 and is presented with information about the WWAN towers 202, 203 and corresponding networks 213, 222, such as coverage area, roaming partners, etc. The user of the device 200 can then choose any of the several WWANs for the communications session, according to his own individual needs.

A provisioning server 217 may also work in concert with a subscription server 224. The subscription server 224 is preferably a computer server that maintains information about users and the networks to which they can be provisioned with communications access. The subscription server 224 has stored in its database identity information, subscription information such as the particular networks for which the user should be allowed communications access, limits on the amount of time or bandwidth to be used, billing information such as the user's credit card number, etc. The subscription server 224 communicates this subscription information to the various provisioning servers 217, 226, which then can provision the user's device 200 for communications access to the WWANs 213, 222 according to the terms of the user's subscription. In this way, a provisioning server 217 is able to grant communications access to only those users who have subscribed to a service plan. Although the subscription server 224 and provisioning server 217 are shown as separate entities in FIG. 2, in an alternative arrangement both the provisioning server 217 and the subscription server 224 function within a single entity. Once a device 200 has subscribed to a network operator, the provisioning servers 217, 226 can be used to update the device 200 with network information, applications, or other data.

To ensure that the identity of the networking device 200 is authentic, thereby preventing fraudulent access to the network, many network operators require that identity information for the device 200 is unique and difficult for a malicious user to intercept or edit. A SIM module 215 is a preferred choice for many networks, such as those operating the Global System for Mobile (GSM) communications standard. To subscribe to a network that requires a SIM, a user typically signs up for service with a network operator, either online or in person, and gives necessary information such as name, address, billing information, etc. This information is processed by the subscription server 224, in either an online or offline process. The user then physically obtains a SIM that contains subscription information, including a unique identifier and authentication credentials (e.g., a master key), which have been associated with the particular user by the subscription server 224. Once the SIM is obtained, the user accesses WWAN networks 213, 222 whose operators have arrangements with the subscription service. The subscription information stored on the SIM is used to authenticate the user to the network. Although many subscription services are operated by individual network operators, a single, independent subscription service can nevertheless be used in conjunction with a number of network operators, even competing network operators. Once connected, the user's networking device 200 subsequently receives additional information, such as software updates, keys permitting access to additional network services, information regarding the user's subscription, etc., from a provisioning server 217.

Alternatively, in an embodiment of the invention a SIM is not physically obtained. Instead, the necessary unique identifier and authentication information is securely communicated to the networking device 200 over a wired or wireless network, and stored onto a SIM or other storage medium 215 at the networking device 200. A user of a networking device 200 in such an arrangement communicates with a provisioning server 217 that in turn communicates with the subscription server 224. The provisioning server, acting as a middleman, collects user information including billing information and presents the user with available subscription options. The user chooses a subscription option and the choice is processed by the subscription server 224. The subscription server generates subscription information including a unique identifier and authentication information (e.g., a master key), which is securely transmitted to the device 200 for storage on a SIM 215 or other storage medium. Using the subscription information, the device 200 then communicates over the subscribed-to network according to the subscription terms. The device 200 is subsequently provided by the provisioning server 217 with updates and additional information, such as a new master key, software updates, keys permitting access to additional network services, information regarding the user's subscription, etc. In some embodiments, the provisioning server 217 updates the device 200 with a new master key automatically at periodic intervals, which prevents the use of a single master key for an extended time.

In some embodiments of the invention, the subscription server 224 communicates with a universal identity server 226 to authenticate subscription requests. The universal identity server (UIS) 226 is a comprehensive database accessible by a variety of entities for authenticating the identities of parties. In one embodiment, a user registers a universal identification card (UIC) with the UIS 226 in a secure, preferably off-line transaction. The UIC operates similarly to a general SmartCard, but has been registered with a UIS 226. When the user subsequently wishes to authenticate his identity to a subscription server 224 to subscribe for WWAN access, he transmits information from his UIC to the subscription server 224. The subscription server 224 then authenticates the user's identity by contacting the UIS and transacting an authentication protocol. The UIS 226 decides whether the user's identity is authentic based on the executed protocol. Because the UIS 226 is a trusted identity server, the subscription server 224 relies on its authentication decision, and permits or denies a subscription to the user accordingly. A UIS 226 can be used in conjunction with a number of subscription servers, even those operated by competing subscription services. Although the subscription server 224 and the UIS 226 are shown as separate entities in FIG. 2, in an alternative arrangement both the subscription server 224 and the UIS 226 function within a single entity. Additionally, the UIS 226 is used to facilitate identification authentication for transactions in a variety of environments outside of WWAN subscriptions.

Figure 3:
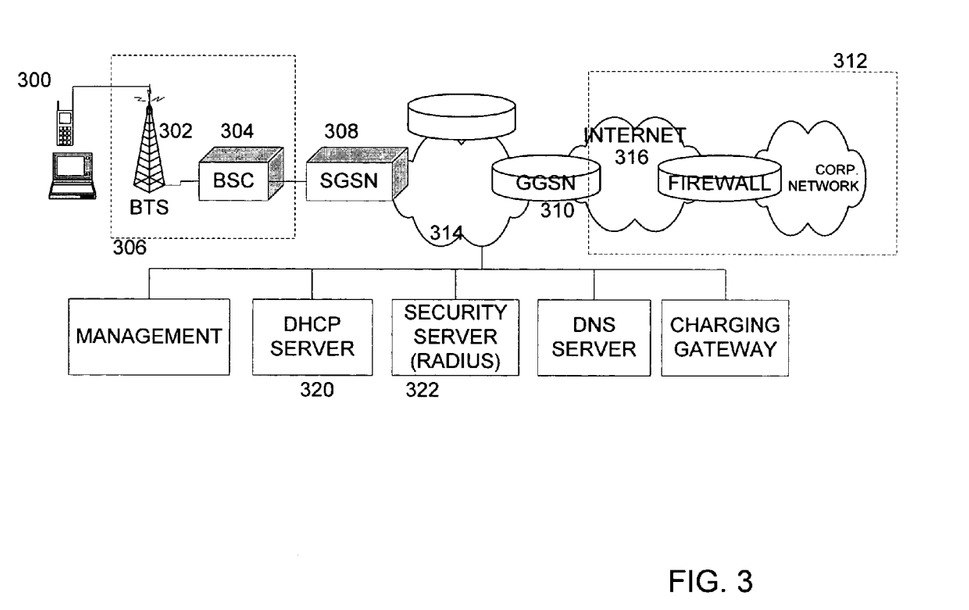
FIG. 3 is an exemplary arrangement of GPRS network components, in accordance with an embodiment of the invention.

Having described an exemplary wireless networking environment wherein the present invention is preferably incorporated, attention is directed to FIG. 3 wherein an exemplary GPRS network is depicted in terms of its components. User sessions are connected from a mobile station 300 to a Base Transceiver Station (BTS) 302, which connects to a Base Station Controller (BSC) 304. The combined functions of the BTS 302 and BSC 304 are referred to as the Base Station Subsystem (BSS) 306. From there, the serving GPRS support node (SGSN) 308 provides access to the gateway GPRS support node (GGSN) 310, which serves as the gateway to the data network 312.

Multiple SGSNs and GGSNs within a GPRS network are referred to collectively as GPRS Support Nodes (GSNs). The connection between the SGSN 308 and the GGSN 310 is enabled through a protocol called the GPRS Tunneling Protocol (GTP). The connection between the GGSN 310 and the packet data network 314 is enabled through the Internet Protocol (IP).

To assign mobile sessions an IP address, the GGSN 310 uses the Dynamic Host Configuration Protocol (DHCP) with a DHCP server 320. The GGSN 310 can use a Remote Dial-In User Service (RADIUS) server 322 to authorize and authenticate the remote users. DHCP and RADIUS services can be specified at the global configuration level (using GPRS DHCP and RADIUS commands), or for each access point configured on the GGSN 310. The GGSN (with an Industry-Standard Architecture (ISA) card), may support the IP security protocol (IPSec) to provide data confidentiality, data integrity, and data authentication between participating peers.

Figure 4:
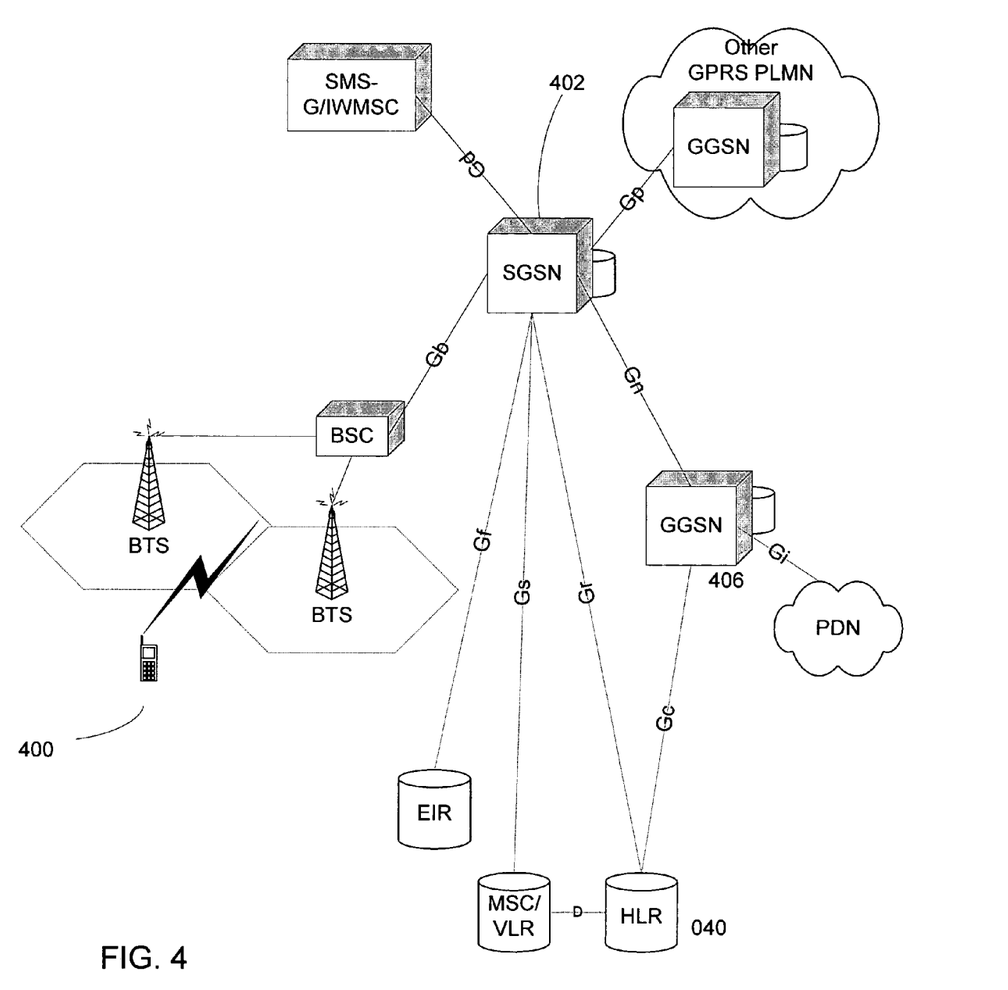
FIG. 4 illustrates a component architecture for a GPRS-based network, to be used in a dynamic online subscription and provisioning system, in accordance with an embodiment of the invention.

An alternative component architecture is shown in FIG. 4 for a GPRS network to be used in a dynamic online subscription and provisioning system, in accordance with an embodiment of the invention. The architecture comprises the user's mobile station 400, an SGSN 402, and a Home Location Register/Authentication Center (HLR/AuC) 404. The AuC component in GSM stores a user's key, international mobile subscriber identity (IMSI) and the algorithms used for authentication. The HLR 404 uses AuC for getting triplets pertaining to a user, used during SIM authentication, communicating with the AuC using a proprietary interface. The mobile station 400 gets a temporary address and the address of an HLR 404 from the GGSN 406 after it selects a network for sign-up. This allows the mobile station 400 to establish a secure HTTPS connection to the HLR 404 for subscription and provisioning.

Figure 5:
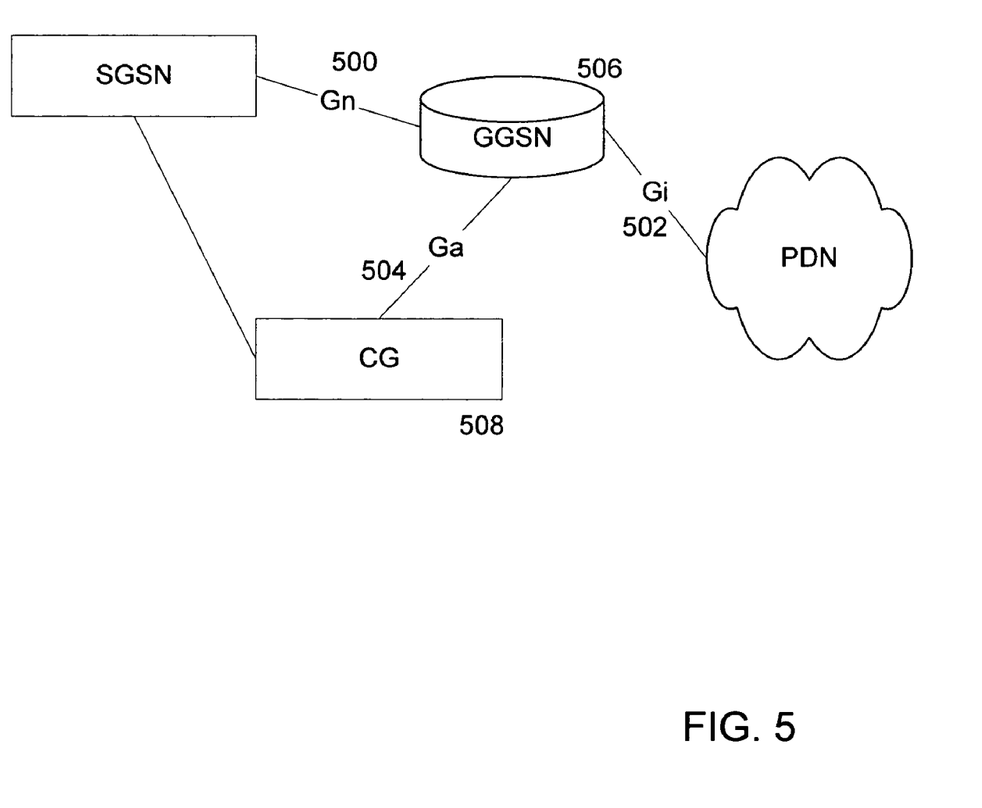
FIG. 5 is a diagram illustrating different interfaces with which communications are enabled over a GPRS-based network.

FIG. 5 shows the GPRS interfaces. The GPRS standards use the term "interface" to label (or identify) the communication path between different GPRS network elements. The GPRS standards define the requirements and characteristics of communication between different GPRS network elements over these interfaces. These interfaces are commonly referred to when describing aspects of a GPRS network. The Gn interface 500 is an interface between GSNs within the same public land mobile network (PLMN) in a GPRS network. GTP is a protocol defined on the Gn interface between GSNs in a GPRS network. The Gi interface 502 is a reference point between a GPRS network and an external packet data network. The Ga interface 504 is an interface between a GGSN 506 and a charging gateway 508 in a GPRS network.

Figure 6:
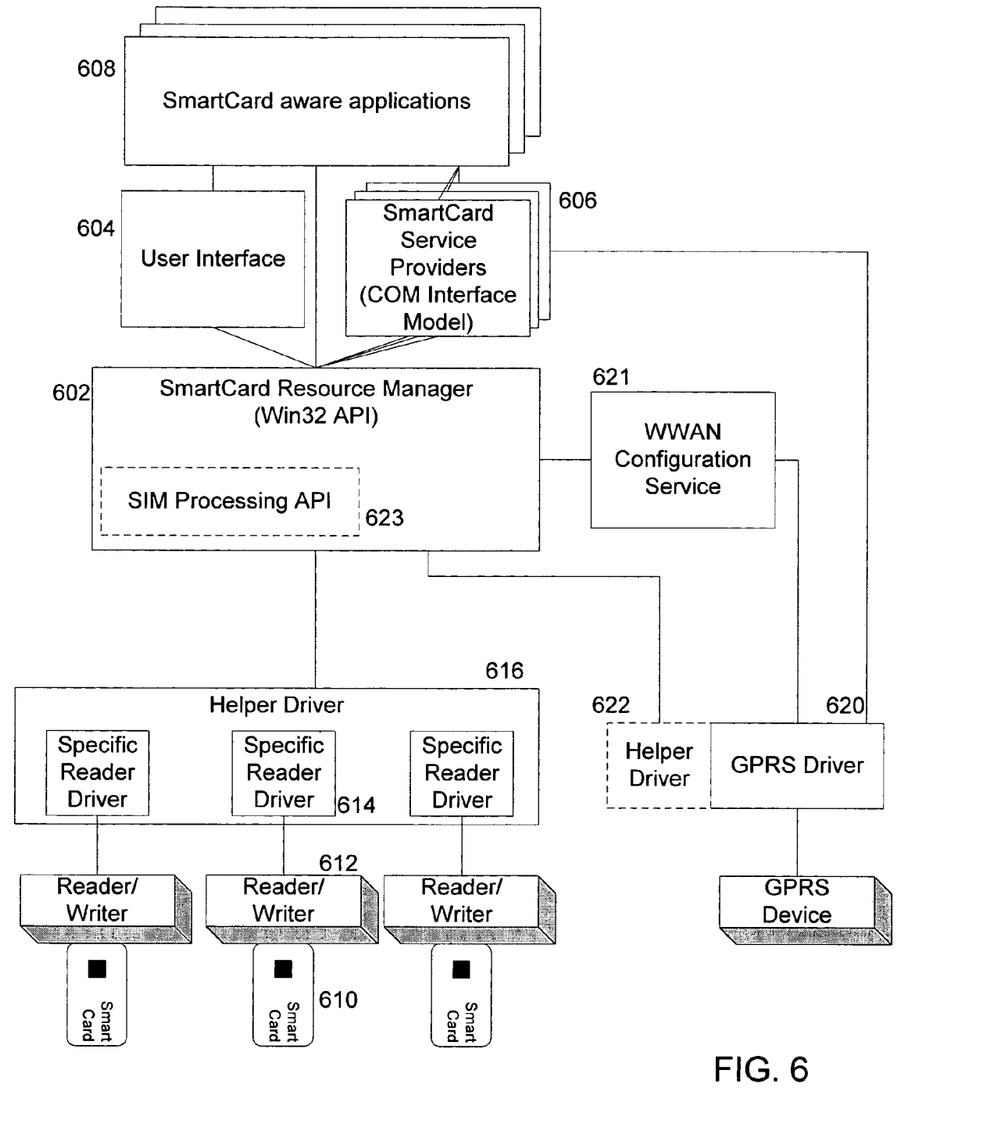
FIG. 6 is an exemplary arrangement of a component infrastructure supporting the use of SmartCards in a computing device.

In accordance with an embodiment of the invention, a subscription server securely transmits credentials to the user's computer that enable the computer to access a GPRS network, and be subsequently provisioned with network information. In one embodiment, the credentials are stored at the user computer in a SmartCard, rather than in a SIM. A SmartCard is typically one of a class of credit-card-sized device with varying capabilities: stored-value cards, contactless cards and integrated circuit cards (ICC). An exemplary infrastructure for supporting SmartCards is shown in FIG. 6, as implemented in the Microsoft Windows environment. The basic components of the smart card subsystem are based on PC/SC standards. These basic components include: a resource manager 602 that uses a Windows application programming interface (API); a user interface (UI) 604 that works with the resource manager 602; and several base service providers 606 that provide access to specific services. In contrast to the resource manager's 602 Windows API, service providers 606 use a COM interface model to provide smart card services. SmartCard-aware applications 608 interact with the resource manager 602 either directly or via the user interface 604 or service providers 606 to read and write to a SmartCard 610. The SmartCard 610 resides physically in a SmartCard reader/writer 612 that communicates with the resource manager 602 via a reader device driver 614 and a reader/writer helper driver 616.

The SmartCard infrastructure enables a SmartCard 610 to be read and written by providers 606. SmartCards are currently used in Windows for PKI certificate-based access, storing the private key and the certificate. The SmartCard has a crypto processor that performs the cryptographic operations relevant to PKI operations. An embodiment of the invention stores a user's authentication credentials and other data in a SmartCard 610. The GPRS device driver 620 on the user's computer communicates with an attached SmartCard 610 by using the standard SmartCard APIs. A WWAN Configuration Service 621 provides the GPRS device driver 620 with an interface to the resource manager 602, enabling the driver 620 to communicate wth the SmartCard 610. Alternatively, the GPRS device driver 620 communicates directly with the resource manager 602 via a helper driver 622. Additional enhanced SmartCard APIs 623 manage SIM specific processing on the card. The enhanced SmartCard APIs 623 allow opaque data sent by a service provider to be written to the SmartCard 610. The opaque data could include, for example, firmware that performs key management and cryptographic processing on the SmartCard 610. In this way, the SmartCard 610 functions to allow the computer to access GPRS networks in the same manner as a traditional SIM.

In one embodiment of the invention, a single SmartCard is used to store credentials for both WWAN access and WLAN access (802.11). In this embodiment, a certificate is stored on the SmartCard to be used for WLAN access, while SIM credentials such as shared key credentials are stored on the card to be used for GPRS services. A protected EAP protocol (PEAP) is used to allow multiple authentication protocols to be used. Alternatively, if a carrier providing GPRS services has a roaming relationship with the 802.11 provider, then a single set of credentials may suffice for access to both networks. If the credentials are not tied to a single device, then a user can use the same SmartCard with multiple devices to gain access to a wireless network from each device. Additionally, because SmartCards are supported on various computer operating systems, devices running operating systems other than Windows can similarly gain access to a wireless network using the generalized SmartCard interface. Furthermore, in some embodiments, if a SmartCard has been provisioned with access to a wireless network while attached to a first device, then removing the SmartCard from the first device and attaching it to a second device enables the second device to access the wireless network. In more detail, when provisioning a SmartCard with data for accessing a network, a WWAN carrier can choose to tie the credentials to a user on a per device basis or to a user for all devices. In case of the former, some unique device information, stored by HLR/AuC, is sent to the SmartCard during the subscription protocol, thereby tying the SmartCard to the device. In this embodiment, the authentication server checks that the device matches the SmartCard when the user attempts to access the WWAN.

Figure 7:
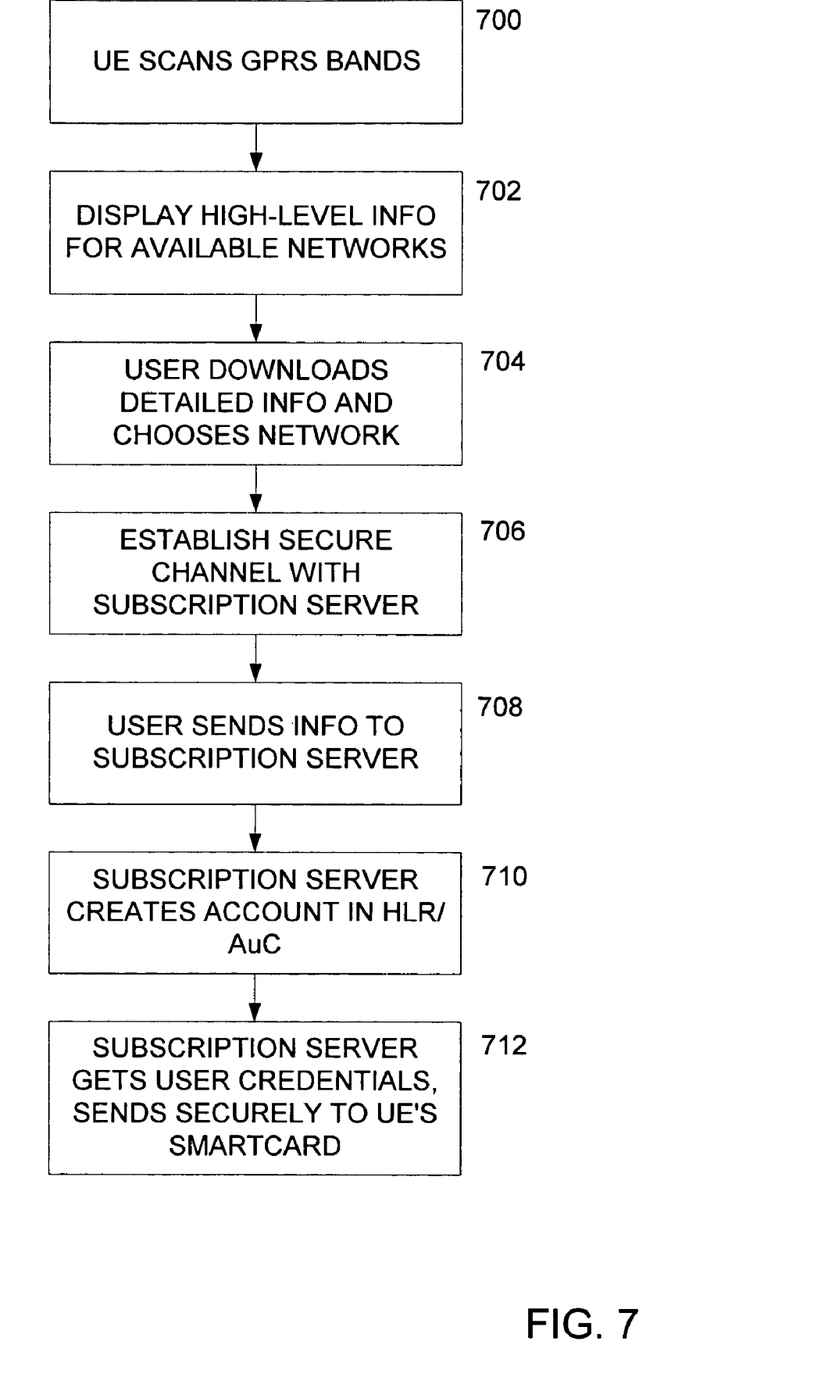
FIG. 7 is a flow diagram illustrating a method of subscribing a wireless networking device to a wireless wide area network, in accordance with an embodiment of the invention.

In FIG. 7, a method is shown for subscribing a wireless device for access to a GPRS network, in accordance with an embodiment of the invention. User equipment (UE), a wireless device, begins by scanning the radio bands used for GPRS at step 700. Additionally, if the user's equipment is capable of communicating over other wireless protocols, such as 802.11b, then those frequencies are also scanned. A user interface on the device displays high-level information about the GPRS carriers available at step 702. By selecting a particular carrier from the user interface at step 704, the user queries the subscription server for the corresponding network and downloads detailed information, such as coverage area, subscription plans, roaming partners, etc., and chooses the carrier to which he wishes to subscribe. Alternatively, the user chooses a carrier for subscription without performing steps 702 and 704 by, for example, querying the subscription server via WLAN. The UE does not, therefore, need to be in contact with any GPRS network in order to subscribe to one. Subscription plans may vary on criteria such as: amount of connection time allowed; amount of bandwidth allowed, such as a cap on the amount of data downloaded or a cap on maximum throughput; roaming partners allowed to be accessed; etc. In some embodiments, the user's equipment communicates with the subscription server indirectly via a provisioning server for the network. A secure channel is then set up between the user's equipment and the subscription server at step 706, using HTTPS, and the subscription server requests information from the user. Once the secure channel is established, the user sends the requested information, such as name, address, credit card, etc., to the subscription server at step 708. This information is sent securely to the charging sub-system in the GPRS network. The subscription server then creates an account for the user in the HLR/AuC at step 710. The subscription server uses the HLR which uses proprietary calls to the AuC to get the user credentials, and it sends those credentials to the SmartCard attached to the user's equipment over the secure HTTPS channel at step 712. Along with the user credentials, the subscription server sends profile information to the SmartCard. A profile is a set of attributes that governs user/device activity over a WWAN. The attributes indicate, for example, roaming partners to be used in preferenced order, credentials to use for different WWANs when the user is roaming, menus of applications enabled on those networks, etc. The user's equipment is now configured to access the GPRS network. In some embodiments, the user's equipment periodically checks for updates to the profile or credentials and downloads the updates accordingly. Alternatively, the subscription server triggers the user's equipment to download the updated information by, for example, sending a SMS or MMS message. In such an example, the subscription server can further request the user's equipment to send device-specific information, such as the amount of available non-volatile RAM.

In an embodiment of the invention, a subscription server provisions a device for access to WWANs on both GPRS-based and CDMA-based networks. The credentials for accessing GPRS-based networks are transmitted to the device using the methods described above, while the credentials for accessing CDMA-based networks are transmitted, for example, using Over The Air Service Provisioning (OTASP) methods.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A subscription module incorporated within a network server, the subscription module facilitating subscribing a networking device for access to at least one wireless wide-area network (WWAN), the module executing the steps of:
   receiving a subscription request from the networking device;
   establishing a secure data link with the networking device in response to the request;
   receiving user information via the secure data link; and
   digitally transmitting subscription information for the networking device from the subscription module to the networking device in response to receiving the user information, the subscription information adapted for configuring the network device for accessing the at least one WWAN;
   wherein the subscription information comprises data for authenticating the networking device during a later attempt by the networking device to access the at least one WWAN.

2. The subscription module of claim 1 further executing the step of causing the networking device to be provisioned with data permitting access to the at least one WWAN.

3. The subscription module of claim 2 wherein the networking device is caused to be provisioned with data permitting access to at least two WWANs for simultaneous communications over the at least two WWANs.

4. The subscription module of claim 2 wherein the networking device is caused to be provisioned with data permitting access to the at least one WWAN for a limited duration.

5. The subscription module of claim 2 wherein the networking device is caused to be provisioned with data permitting access to the at least one WWAN with a limit on the amount of data to be transmitted.

6. The subscription module of claim 1 wherein receiving a subscription request comprises receiving wirelessly a subscription request from the networking device.

7. The subscription module of claim 1 wherein digitally transmitting subscription information comprises transmitting wirelessly to the networking device.

8. The subscription module of claim 7 wherein transmitting wirelessly comprises transmitting over a WWAN.

9. The subscription module of claim 7 wherein transmitting wirelessly comprises transmitting over a WLAN.

10. The subscription module of claim 1 further executing the step of accepting information to be associated with the networking device.

11. The subscription module of claim 10 wherein accepting information comprises accepting identification and authentication information.

12. The subscription module of claim 1 further executing the step of authenticating the user information.

13. The subscription module of claim 12 wherein the step of authenticating the user information comprises transacting with a universal identity server.

14. The subscription module of claim 1 wherein the at least one WWAN is a GPRS-based network.

15. The subscription module of claim 1, the subscription module facilitating subscribing a networking device for access to at least two WWANs, wherein at least one WWAN is a GPRS-based network and at least one WWAN is a CDMA-based network.

16. The subscription module of claim 1 wherein digitally transmitting subscription information comprises digitally transmitting a master key to be used in accessing the at least one WWAN.

17. The subscription module of claim 16 further executing the step of causing the master key to be digitally refreshed at a periodic interval.

18. The subscription module of claim 1 wherein user information comprises name information, address information and/or billing information associated with the subscription.

19. The subscription module of claim 1 wherein the subscription information further comprises a key for encrypting communications.

20. A method of subscribing a networking device for access to at least one wireless wide-area network (WWAN), comprising the steps of:
receiving a subscription request;
establishing a secure data link with the networking device in response to the request;
receiving user information via the secure data link; and
digitally transmitting subscription information for the networking device in response to receiving the user information;
wherein the subscription information comprises data for authenticating the networking device during a later attempt by the networking device to access the at least one WWAN.

21. The method of claim 20 further comprising causing the networking device to be provisioned with data permitting access to the at least one WWAN.

22. The method of claim 21 wherein causing the networking device to be provisioned comprises causing the networking device to be provisioned with data permitting access to at least two WWANs for simultaneous communications over the at least two WWANs.

23. The method of claim 21 wherein causing the networking device to be provisioned comprises causing the networking device to be provisioned with data permitting access to the at least one WWAN for a limited duration.

24. The method of claim 19 wherein causing the networking device to be provisioned comprises causing the networking device to be provisioned with data permitting access to the at least one WWAN with a limit on the amount of data to be transmitted.

25. The method of claim 20 wherein receiving a subscription request comprises receiving wirelessly a subscription request from the networking device.

26. The method of claim 20 wherein digitally transmitting subscription information comprises transmitting wirelessly to the networking device.

27. The method of claim 26 wherein transmitting wirelessly comprises transmitting over a WWAN.

28. The method of claim 26 wherein transmitting wirelessly comprises transmitting over a WLAN.

29. The method of claim 20 further comprising the step of accepting information to be associated with the networking device.

30. The method of claim 29 wherein accepting information comprises accepting identification and authentication information.

31. The method of claim 20 further comprising the step of authenticating the user information.

32. The method of claim 31 wherein the step of authenticating the user information comprises transacting with a universal identity server.

33. The method of claim 20 wherein the at least one WWAN is a GPRS-based network.

34. The method of claim 20, the method for subscribing a networking device for access to at least two WWANs, wherein at least one WWAN is a GPRS-based network and at least one WWAN is a CDMA-based network.

35. The method of claim 20 wherein digitally transmitting subscription information comprises digitally transmitting a master key to be used in accessing the at least one WWAN.

36. The method of claim 35 further comprising the step of causing the master key to be digitally refreshed at a periodic interval.

37. The method of claim 20 wherein user information comprises name information, address information and/or billing information associated with the subscription.

38. The method of claim 20 wherein the steps are performed without human interaction.

39. The method of claim 20 wherein the subscription information further comprises a key for encrypting communications.

40. A method of subscribing a networking device for access to at least one wireless wide-area network (WWAN), comprising the steps of:
contacting a subscription service over a network;
digitally receiving over the network subscription information for the networking device from the subscription service; and
storing the received subscription information in a storage medium accessible by the networking device;
wherein the subscription information comprises data for authenticating the networking device during a later attempt by the networking device to access the at least one WWAN.

41. The method of claim 40 wherein contacting the subscription service over a network comprises contacting the subscription service wirelessly over the WWAN using the networking device.

42. The method of claim 40 wherein the receiving step is performed wirelessly using the networking device.

43. The method of claim 40 further comprising the step of providing information to be associated with the networking device.

44. The method of claim 43, wherein providing information to be associated with the networking device comprises providing user information.

45. The method of claim 44, wherein the user information comprises name information, address information, and/or billing information.

46. The method of claim 40, wherein contacting the subscription service comprises providing identification and authentication information to be associated with the networking device to the subscription service over a secure data link.

47. The method of claim 40 wherein storing the subscription information comprises storing the subscription information in a portable medium and subsequently connecting the portable medium to the networking device.

48. The method of claim 47 wherein the portable medium is a Smart Card.

49. The method of claim 47 wherein the portable medium is a Universal Identity Card.

50. The method of claim 47 wherein the portable medium is a USB flash drive.

51. The method of claim 47 wherein transferring the portable medium to a second networking device allows the second networking device to access the at least one WWAN.

52. The method of claim 40 wherein storing the subscription information comprises storing the subscription information in a SIM card within the networking device.

53. The method of claim 40 wherein the subscription information further comprises a key for encrypting communications.

54. The subscription module of claim 40 wherein contacting the subscription service comprises contacting the subscription service while the networking device comprises no prior subscription information for the WWAN.

55. The method of claim 40, further comprising accessing the stored subscription information to later access the WWAN.

56. In a system comprising a subscription service and a plurality of wireless networks operated by a plurality of network carriers, a method of provisioning a networking device to access any of the plurality of wireless networks, the method comprising the steps of:

receiving, by the subscription service, a subscription request from the networking device;

digitally transmitting, by the subscription service, a first set of subscription information to the networking device in response to the request;

wherein the first set of subscription information allows the networking device to access any of the plurality of wireless networks;

sending, by the subscription service, a second set of subscription information to at least one network carrier from the plurality of network carriers;

wherein the second set of subscription information is used by a wireless network operated by the at least one network carrier to allow the networking device to access the wireless network;

receiving, from the at least one network carrier, usage information regarding networking activity involving the networking device; and maintaining, by the subscription service, user information regarding the networking device;

wherein the user information comprises name information, address information, and/or billing information.

57. The provisioning method of claim 56, wherein the user information comprises address information.

* * * * *

UNITED STATES PATENT AND TRADEMARK OFFICE
CERTIFICATE OF CORRECTION

PATENT NO. : 7,505,756 B2 Page 1 of 1
APPLICATION NO. : 10/778849
DATED : March 17, 2009
INVENTOR(S) : Pradeep Bahl It is certified that error appears in the above-identified patent and that said Letters Patent is hereby corrected as shown below:

At column 15, line 27, "subscription module" should read -- method --

Signed and Sealed this

Thirteenth Day of April, 2010

David J. Kappos
*Director of the United States Patent and Trademark Office*